Dec. 20, 1938.  C. L. CALKINS  2,140,573

ELECTRICAL IMPULSE GENERATOR

Filed March 16, 1934  3 Sheets-Sheet 1

Inventor
Chauncey L. Calkins
by Parker & Carter
Attorneys.

Dec. 20, 1938.  C. L. CALKINS  2,140,573
ELECTRICAL IMPULSE GENERATOR
Filed March 16, 1934  3 Sheets-Sheet 2
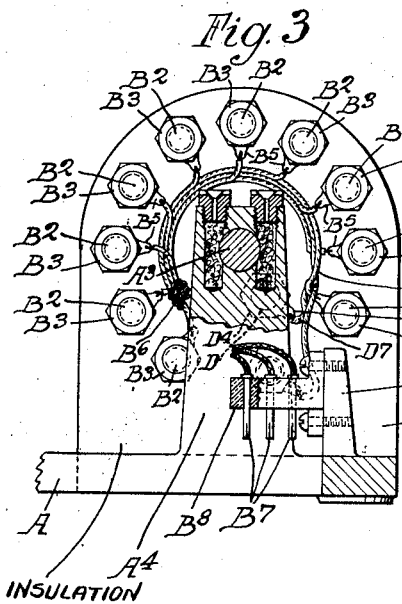
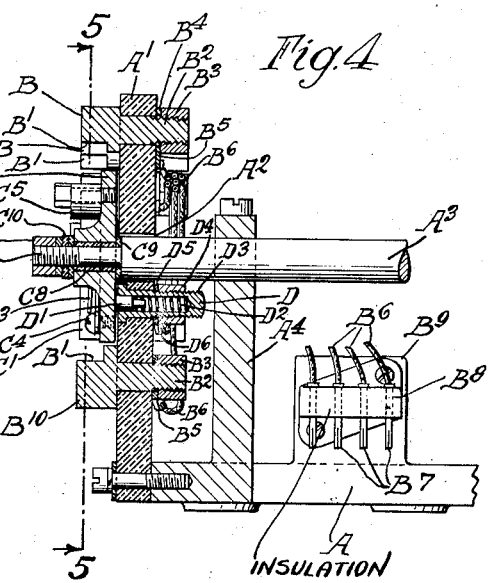
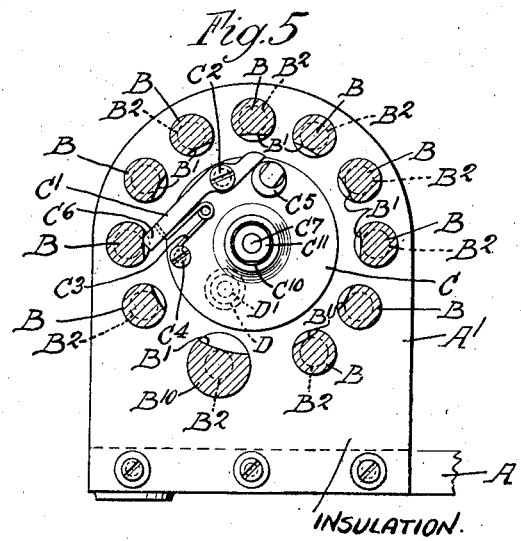
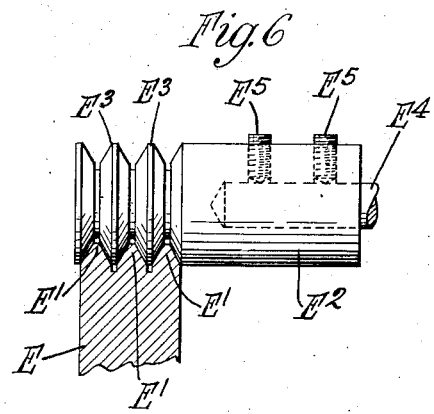
Inventor
Chauncey L. Calkins
by Parker & Carter
Attorneys Dec. 20, 1938.　　　C. L. CALKINS　　　2,140,573
ELECTRICAL IMPULSE GENERATOR
Filed March 16, 1934　　　3 Sheets-Sheet 3
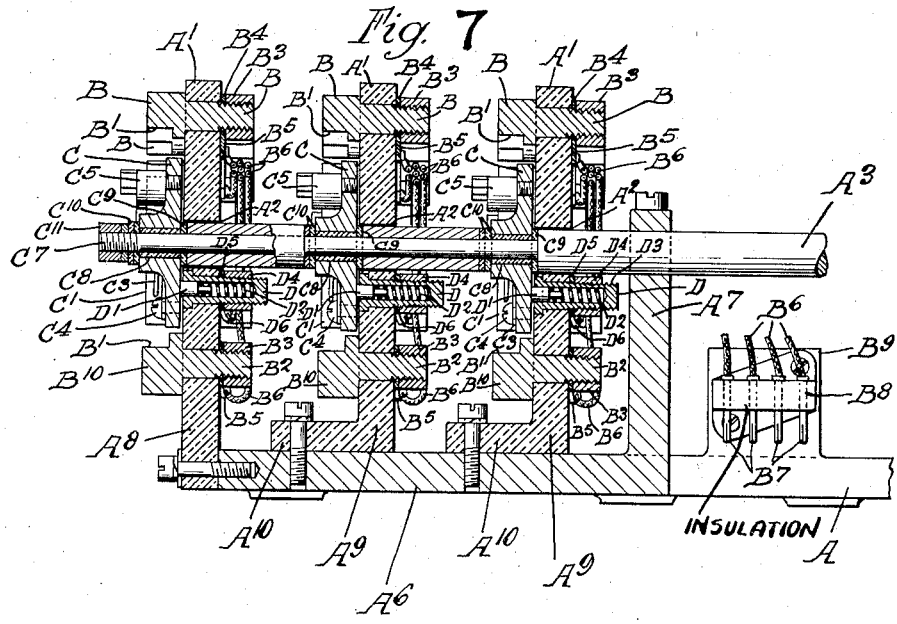
Inventor
Chauncey L. Calkins
by Parker + Carter
Attorneys.

Patented Dec. 20, 1938

2,140,573

UNITED STATES PATENT OFFICE 2,140,573

ELECTRICAL IMPULSE GENERATOR

Chauncey L. Calkins, Chicago, Ill., assignor to Lothar A. Ederer, Chicago, Ill.

Application March 16, 1934, Serial No. 715,906

10 Claims. (Cl. 200—26)

My invention relates to improvements in electric impulse generating apparatus for generating rapid regular timed impulses such as are used in the automatic electric transmission of messages.

One object of my invention is to provide apparatus which will generate a series of regular, equally timed electric impulses of substantial power. Another object of my invention is to provide an electrical impulse generator which will commence its operation quickly and cease its operation abruptly. Another object of the invention is to provide a simple structure for generating more than one series of electrical impulses simultaneously in independent circuits. Other objects will appear from time to time in the course of the specification and claims.

I have shown herewith a preferred form of such an impulse generator and a variation of construction, making possible the generation of three trains of impulses simultaneously.

The invention is illustrated more or less diagrammatically in the accompanying drawings, wherein:—

Figure 3 shows a rear elevation of electric contacts and bearing of the impulse generating switch, with parts in section on line 3—3 of Figure 1;

Figure 4 is a vertical section through the impulse generating switch, taken at line 4—4 of Figure 2;

Figure 5 is an end view of the impulse generating switch with the contacts in section, with parts in section at line 5—5 of Figure 4;

Figure 6 is a detail of the drive, on an enlarged scale;

Figure 7 is a vertical, longitudinal section, similar to Figure 4, of a modified form of the impulse generating switch in multiple providing three electric impulse generators.

Like parts are designated by like characters throughout the specification and drawings.

A is a base plate of any suitable material. $A^1$ is a support of insulating material attached to it and perforated as at $A^2$. A shaft $A^3$ passes through the perforation without contact with the member $A^1$. $A^4$ is a supporting member joined to the base A, perforated to receive and support the shaft $A^3$ as a bearing. $A^5$ is an additional supporting member joined to the base plate A and serving also as a supporting and bearing member for the shaft $A^3$. In the modified form shown in Figure 7 there is an enlarged base plate $A^6$ which is generally similar to the plate A but enlarged to receive additional parts. A support $A^7$ is similar to the support $A^4$ shown in the earlier figures and serves to provide a bearing for the shaft $A^3$. Additional contact supporting members formed of insulating material are provided. There is thus a contact supporting member $A^8$ which is substantially like the member $A^1$ of the earlier figures and there are further contact supporting members $A^9$, $A^9$, which are identical with each other and each of which may have a flange or projecting member $A^{10}$ by means of which it is joined to the base $A^6$ by a screw or by any other suitable means.

The contact members will now be described. As indicated the member $A^1$ is an insulated contact supporting part. It has mounted in it a plurality of contacts B. As shown there are ten of these. The contact members B are mounted about the perforation $A^2$ and concentrically with it and each is preferably provided on its inner face with an arcuate contact portion $B^1$. The contact members as shown extend through suitable perforations in the support $A^1$ and are reduced in diameter and provided at their ends opposite the contact parts with threaded portions $B^2$ to receive holding nuts $B^3$. About the reduced threaded portion $B^2$ of each contact member a connecting part $B^4$ is positioned and these connecting parts are preferably provided with ears $B^5$ to receive wires $B^6$, which may be received in terminals $B^7$ in an insulating block $B^8$, which latter may be carried upon a supporting member $B^9$ attached to or supported from the base plate A. There may be one contact member which is larger than the others. For example, the member $B^{10}$ is shown as larger than the other members. Like them it is preferably provided with an arcuate cut-away contact portion $B^1$.

Figure 2:
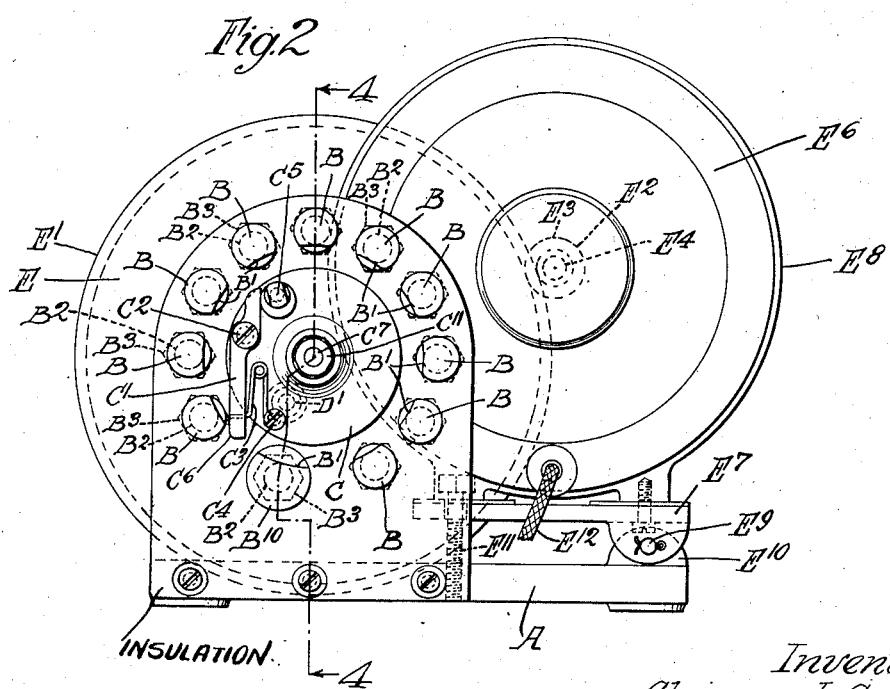
Figure 2 is an end elevation showing the impulse generating switch and motor.

A plate C may be attached to the shaft $A^3$ or to an extension of it. In the form of the invention shown in Figure 7 three such plates are carried from the shaft or upon an extension of the shaft. $C^1$ is a wiper lever pivoted upon the plate C as at $C^2$. $C^3$ is a spring mounted upon the plate C bearing at one end upon the lever $C^1$ to force it outwardly and bearing at the other end against a screw or other stop $C^4$. $C^5$ is an adjustable stop eccentrically mounted in the plate C so that it may be rotated to adjust its position with respect to the lever $C^1$ and thus adjustably to control the movement of the lever $C^1$ in a clock-wise direction as seen for example in Figures 2 and 5. At its outer or free end the lever $C^1$ is provided with a rounded nose portion $C^6$ adapted to contact the contact members B, and in particular to make contact with their arcuate portions $B^1$. While the plate C might be attached to the shaft $A^3$ in many different ways, in the form here shown, in Figure 4 for example, it is mounted upon an extension $C^7$ of the shaft $A^3$. An insulating tube $C^8$ is mounted upon the extension $C^7$ and is provided with an insulating flange $C^9$. One or more insulating washers $C^{10}$ are provided adjacent the outer end of the tubular insulator $C^8$ and a nut $C^{11}$ holds the parts in the position shown in Figure 4. As shown in Figure 7, the extension $C^7$ is further elongated and for each plate C there is provided the insulating sleeve $C^8$ having a flange $C^9$ as well as the insulating washer $C^{10}$. Thus the construction of Figure 7 differs from that of Figure 4 in this respect only, in the fact that there is a longer extension $C^7$ and that the mounting of the plate C and its insulation is repeated in triplicate.

D is the shell or socket of a fixed wiping contact which is positioned within the member $A^1$ and comprises a movable contact plunger $D^1$ mounted within the shell D and a spring $D^2$ positioned within the shell bearing at one end upon its closed end and at the other end against the plunger $D^1$ to press it outwardly and hold it in contact with the plate C. The outer end of the shell D is threaded as at $D^3$ to receive a nut $D^4$ by means of which it is held in place. A connecting part $D^5$ is also mounted about the threaded portion and is provided with an ear $D^6$ to which a wire $D^7$ may be attached.

Figure 1:
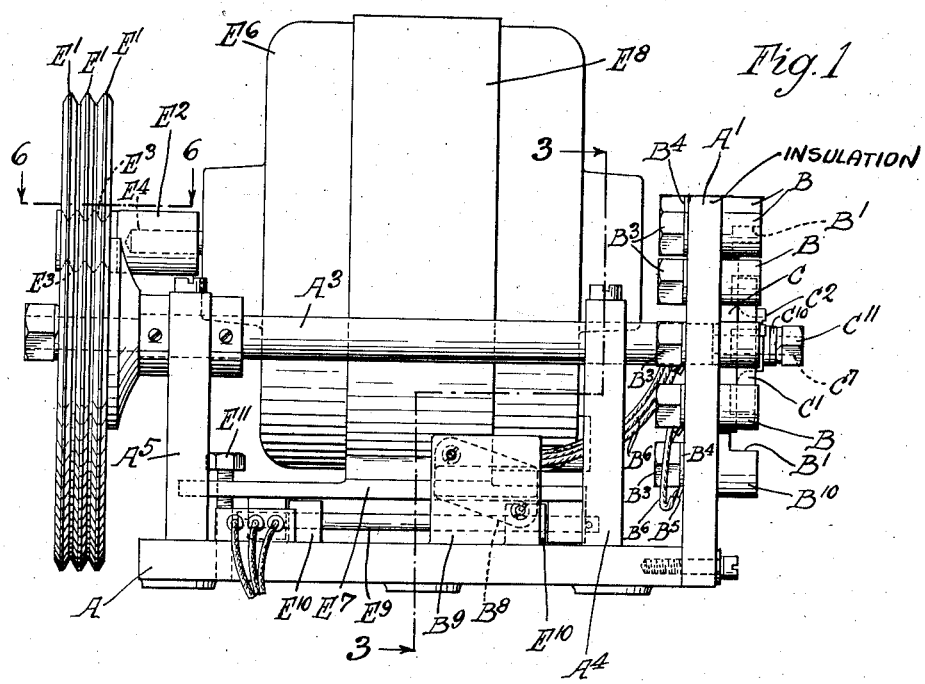
Figure 1 is an elevation showing the generating switch, the driving motor, and the driving connection to the switch.

At the end of the shaft $A^3$ opposite to that which carries one or more plates C is mounted a driven friction wheel E. It may be shaped to provide the raised driving portions $E^1$, $E^1$, as shown particularly in Figures 1 and 6. This wheel E may be attached to the shaft in any desired manner. It must be fixed against rotation with respect to the shaft because its purpose is to provide a means by which the shaft may be driven. The wheel E is in driving contact with a stub shaft $E^2$ which is shaped to provide driving portions $E^3$ $E^3$ which are in driving contact with the members $E^1$, $E^1$ of the wheel E. The stub shaft $E^2$ is fixed upon a motor shaft $E^4$ by set screws $E^5$ or otherwise. The shaft $E^4$ is the shaft of an electric motor $E^6$. The motor $E^6$ is mounted upon a rocking frame or cradle $E^7$ and may be held thereupon by screws or otherwise. The cradle or rocking frame $E^7$ is trunnioned or pivoted on a shaft $E^9$ which is supported in ears $E^{10}$ attached to or formed as a part of the base plate A. $E^{11}$ is an adjusting screw positioned in the cradle $E^7$ at a point preferably away from the shaft $E^9$ and shaped and positioned to adjust the position of the cradle up or down. $E^{12}$ is a cable or wire connection by means of which electrical driving current is supplied to the motor.

It will be realized that whereas I have herewith shown and described a practical operative device, nevertheless many changes might be made in the size, shape, number and disposition of parts without departing from the spirit of my invention and I wish, therefore, that my showing be taken as in a sense diagrammatic.

The use and operation of my invention are as follows:

The impulse generator is intended primarily to be used in connection with the automatic electric transmission of messages though it may be used wherever a series of regular timed electric impulses are required.

The unit is provided with its own base which makes it readily attachable to other apparatus as a renewable unit, although it may merely be placed adjacent the apparatus and have only electrical connection with the apparatus.

It is provided with its own power leads, led to a convenient plug and socket type of connection. Likewise the electric wires carrying the individual impulses are brought out to a terminal block.

The only requirement for operation is that suitable current be supplied to drive the motor $E^6$ and suitable current be supplied to the wire connecting with the wiper button $D^1$. The motor $E^6$ being energized and in motion, it transmits its rotation to the switch drive shaft $A^3$ through the reduction drive consisting of the friction wheels E and $E^3$. These wheels may be of any desired size thus making possible a wide range of speed control of the rotary switch for any given motor speed.

This adjustment of the motor permits adjustment of the friction drive between the wheels E and $E^3$.

The rotation of the shaft $A^3$, driven by the friction wheel E, rotates the plate C and causes the attached contacting lever $C^1$ to move in a circular path across the faces of the contact buttons B, B. This lever $C^1$, which makes and breaks a circuit brought to the wiper button $D^1$ and completed through the buttons B, etc. to an outside circuit, is the actual contact member generating the impulses. It has a rounded contact nose suited to its contacting and wiping functions. The regularity of the impulses is determined by the equal spacing of the buttons $B^1$. The duration of the impulse for any speed of rotation is determined by the length of the arcuate face $B^1$ of the buttons. By this construction it is seen that complete control is had over both the regularity and timing of certain groups of impulses produced by such a machine. This regularity and exact timing is essential to the best and fastest operation of certain types of mechanism adapted to be driven by such impulse trains.

It is particularly to be noted that this apparatus may be arranged to generate one or more impulses of different timing than the first chosen regular group of impulses. To accomplish this it is only necessary to change the location of one or more buttons with respect to a regular spacing of others, or to change the width of the curved contact, or both. Such a button, changed both with respect to position from the regular and also as to width of face is shown at $B^{10}$. Such a button is used to transmit an impulse to perform some single special function.

The lever $C^1$ is adjusted by means of the eccentric stop $C^5$ and it is continuously pressed either against this stop or against the buttons by the spring $C^3$ and this adjustment controls the normal or free path of the nose $C^6$ of the lever $C^1$ and hence makes it possible to adjust both the point of contact, the manner of contacting and the breaking of contact and also to some extent the exact time of contact which in turn affects the time length of the electric impulse.

Such adjustment is highly important to obtain long life of the apparatus as well as to obtain exact timing of the impulses.

The rounded nose or radius portion $C^6$ of the lever $C^1$ contacts the surface $B^1$ with a wiping action. Depending on the adjustment of the lever arm $C^1$ that part of the radius $C^6$ which contacts the arcuate surface $B^1$ may be changed. Also in the normal rotary movement of the lever about the shaft from which it is carried, the first contact of the radius $C^6$ with the leading edge of the arcuate portion $B^1$ occurs at a different point of the radius from the final contact. Thus in contacting each member B the initial contact is at one point of the radius $C^6$ and the final contact is at another point, that is, the contact is broken at a different point on the member $C^6$ from that at which it was first made, thus maintaining a clean contact surface $B^1$ and at the contacting portion of the radius $C^6$, during the impulse generating period.

This apparatus is capable of handling a substantial current of an ampere or more and of delivering impulses at a speed greater than twenty per second under steady operation. It has been found desirable in such apparatus to so arrange the contacts that the ratio of contact distance to open distance is as three to seven. This proportion makes for the highest speed of operation together with longest life of the contacts.

For the purpose of causing the arc at contact break to form off the wiping surface of the contact not only the nose of the wiping lever is rounded but also the breaking edge of the button is slightly chamfered. This causes the lever nose to pass slightly off the true wiping surface before breaking contact.

In the operation of such devices it is often desirable to stop operation suddenly, for example, in 20° to 30°. This requires that all moving parts be light to avoid inertia loads and that the drive be of a type capable of absorbing by slip or elasticity excessive shock. This is accomplished in the structures shown by the small dimensions of the rotary parts and their compact location and also by the use of a friction drive which is ample to rotate the plate and contact lever under normal conditions but which can slip under severe load, or under abnormal load.

Advantage has been taken of the construction of the friction drive which is adjustable to provide a holding means to clamp the motor $E^6$ during shipment or other rough handling. The motor is trunnion mounted and provided with the adjusting screw $E^{11}$. To lock the motor this screw is backed off to free the motor completely from the friction drive and a block is then slipped between the motor and the base A and the screw $E^{11}$ drawn up to hold the motor rigidly against the block.

I claim:

1. In an electric impulse generating apparatus, a series of electric contacts, a rotary contact switch member comprising a pivotally mounted contacting arm and means for moving it across the contacts positively, positive means for relatively adjusting the points of contact of the moving contact arm upon the stationary contacts of the series, to a predetermined extent and electric conductors connected to the electric contacts and to the rotary contact switch member, whereby electric paths are regularly formed and broken.

2. In an electric impulse generating apparatus, a series of circularly arranged electric contacts, a rotary contact switch member comprising a pivotally mounted contacting arm and means for moving it across the contacts positively, positive means for relatively adjusting the points of contact of the moving contact arm upon the stationary contacts of the series, and including an adjustable eccentric stop member engaging the switch arm and defining the normal position thereof to a predetermined extent and electric conductors connected to the electric contacts and to the rotary contact switch member, whereby electric paths are regularly formed and broken.

3. In an electric impulse generating apparatus, a series of electric contacts, a yieldingly mounted rotary contact switch member comprising a pivotally mounted contacting arm and means for moving it across the contacts, positive means for relatively adjusting the points of contact of the moving contact arm upon the stationary contacts of the series, and electric conductors connected to the electric contacts and to the rotary contact switch member, whereby electric paths are regularly formed and broken said adjustment means comprising means for adjustably controlling the path of said contact arm to a positive predetermined extent.

4. In an electric impulse generating apparatus, a series of circularly arranged electric contacts, a yieldingly mounted rotary contact switch member comprising a pivotally mounted contacting arm and means for moving it across the contacts, positive means for relatively adjusting the points of contact of the moving contact arm upon the stationary contacts of the series and electric conductors connected to the electric contacts and to the rotary contact switch member, whereby electric paths are regularly formed and broken said adjustment means comprising means for adjustably controlling the path of said contact arm to a positive predetermined extent.

5. In an electric impulse generating apparatus, a series of regularly circularly arranged electric contacts, a yieldingly mounted rotary contact switch member comprising a pivotally mounted contacting arm and means for moving it across the contacts, positive means for relatively adjusting the points of contact of the moving contact arm upon the stationary contacts of the series and electric conductors connected to the electric contacts and to the rotary contact switch member, whereby electric paths are regularly formed and broken said adjustment means comprising means for adjustably controlling the path of said contact arm to a positive predetermined extent.

6. In an electric impulse generating apparatus, a series of regularly circularly arranged electric contacts, a yieldingly mounted rotary contact switch member comprising a pivotally mounted contacting arm and means for moving it across the positive contacts, positive means for relatively adjusting the points of contact of the moving contact arm upon the stationary contacts of the series, and including an adjustable eccentric stop member engaging the switch arm and defining the normal position thereof, and electric conductors connected to the electric contacts and to the rotary contact switch member, whereby electric paths are regularly formed and broken.

7. In an electric impulse generating apparatus, a plurality of circularly spaced electric contact members, a contact face on each, and a wiper carrier positioned to rotate at the center of the circle about which such contacts are spaced, a wiper arm pivoted upon said carrier, said wiper arm having a contact end extended beyond said carrier and positioned to contact said contact members, and means for urging said wiper arm outwardly and means for controlling the outward movement of said wiper arm.

8. In an electric impulse generating apparatus, a plurality of circularly spaced electric contact members, a contact face on each, and a wiper carrier positioned to rotate at the center of the circle about which such contacts are spaced, a wiper arm pivoted upon said carrier, said wiper arm having a contact end extended beyond said carrier and positioned to contact said contact members, and means for urging said wiper arm outwardly and means for controlling the outward movement of said wiper arm, said latter means comprising a member positioned to contact a portion of said wiper arm to act as a stop therefor, and to limit the outward movement of the contact end of said wiper arm.

9. In an electric impulse generating apparatus, a plurality of circularly spaced electric contact members, a contact face on each, and a wiper carrier positioned to rotate at the center of the circle about which such contacts are spaced, a wiper arm pivoted upon said carrier, said wiper arm having a contact end extended beyond said carrier and positioned to contact said contact members, and means for urging said wiper arm outwardly and means for controlling the outward movement of said wiper arm, said latter means comprising a member positioned to contact a portion of said wiper arm to act as a stop therefor, and to limit the outward movement of the contact end of said wiper arm, said stop being provided with an eccentric base by means of which it may be moved eccentrically to vary its position and to vary the outward movement of said wiper arm.

10. In an electric impulse generating apparatus, a plurality of circularly spaced electric contact members, each provided with an arcuate cut away contact face, and a wiper carrier positioned to rotate at the center of the circle about which such contacts are spaced, a wiper arm pivoted upon said carrier, said wiper arm having a contact end extended beyond said carrier and positioned to contact said contact members, and spring means for urging said wiper arm outwardly irrespective of the movement of said wiper carrier and positive means for variably controlling the outward movement of said wiper arm, said latter means comprising a member positioned to contact a portion of said wiper arm to act as a stop therefor, and to limit the outward movement of the contact end of said wiper arm, said stop being provided with an eccentric base by means of which it may be moved eccentrically to vary its position and to vary the outward movement of said wiper arm.

CHAUNCEY L. CALKINS.